April 28, 1925.
R. STEELE
BOX AND METHOD OF MAKING THE SAME
Filed July 13, 1920    4 Sheets-Sheet 1
1,535,958
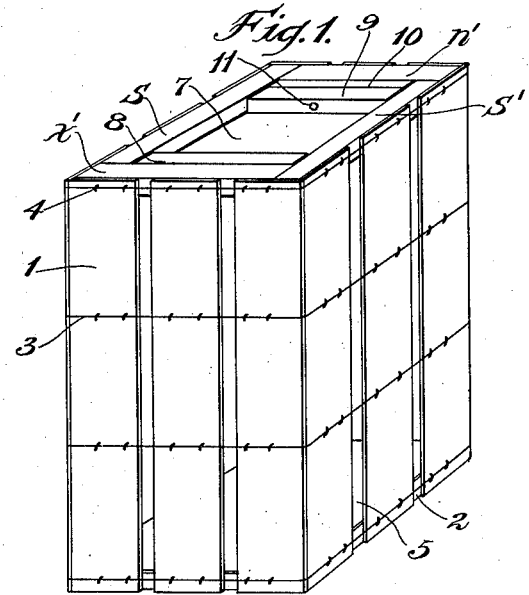
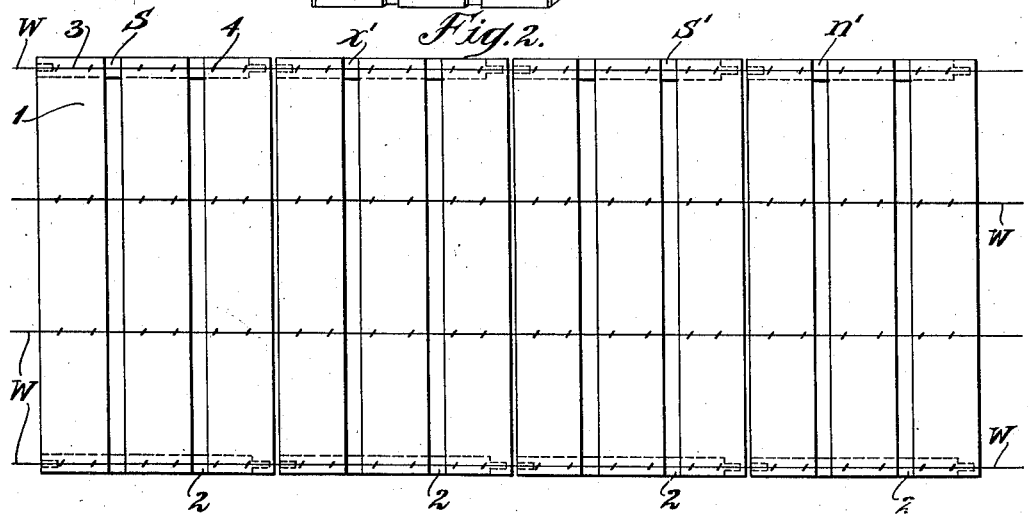
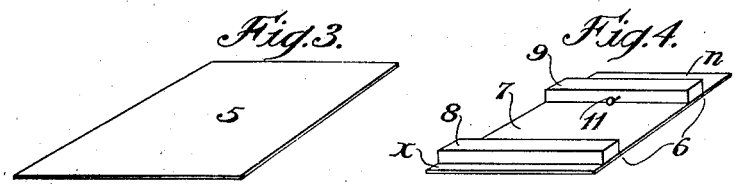
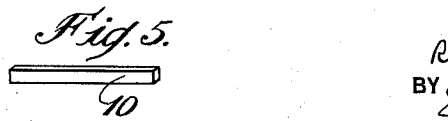
INVENTOR
Roscoe Steele
BY Edward F. Dunne Jr.
ATTORNEY April 28, 1925.
R. STEELE
1,535,958
BOX AND METHOD OF MAKING THE SAME
Filed July 13, 1920  4 Sheets-Sheet 2
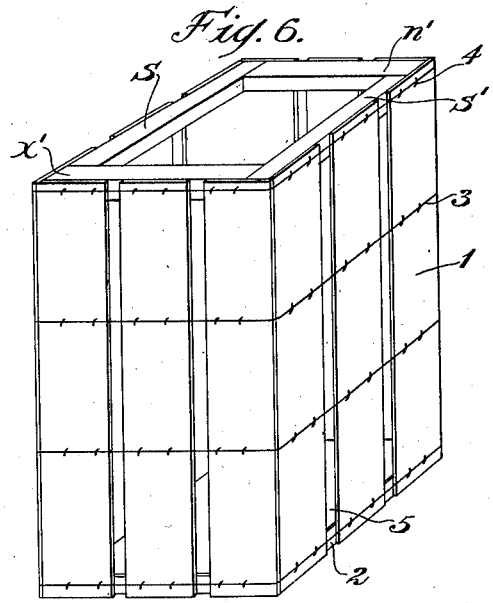
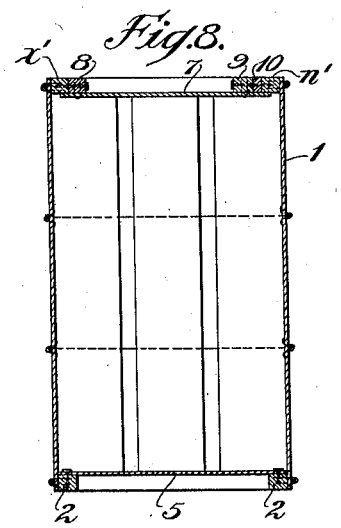
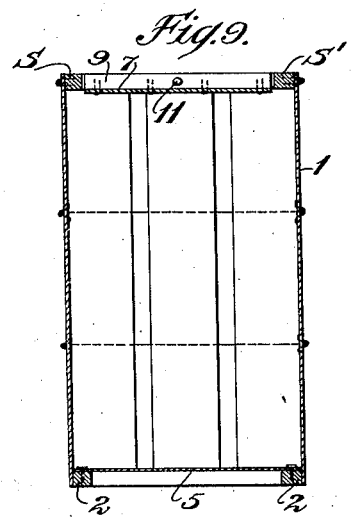
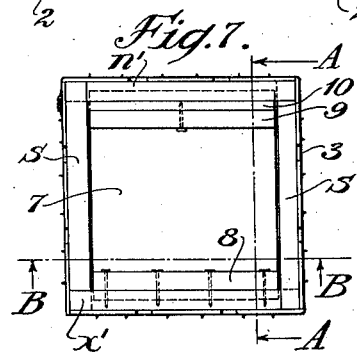
INVENTOR
Roscoe Steele
BY Edward Dunne Jr.
ATTORNEY April 28, 1925.  1,535,958

R. STEELE

BOX AND METHOD OF MAKING THE SAME

Filed July 13, 1920    4 Sheets-Sheet 3

INVENTOR
Roscoe Steele
BY Edward F. Dunne
ATTORNEY

April 28, 1925.                                              1,535,958
                         R. STEELE
                BOX AND METHOD OF MAKING THE SAME
                     Filed July 13. 1920        4 Sheets-Sheet 4
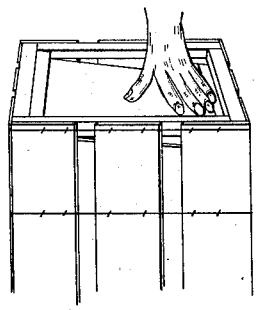
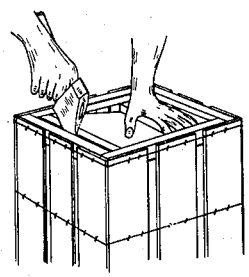
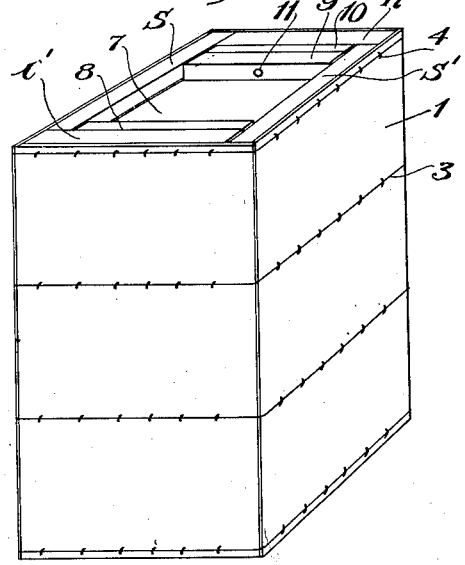
INVENTOR
Roscoe Steele
BY
Edward Dunne jr.
ATTORNEY Patented Apr. 28, 1925.

1,535,958

UNITED STATES PATENT OFFICE.

ROSCOE STEELE, OF ROCKAWAY, NEW JERSEY, ASSIGNOR TO WIREBOUNDS PATENTS COMPANY, A CORPORATION OF MAINE.

BOX AND METHOD OF MAKING THE SAME.

Application filed July 13, 1920. Serial No. 395,838.

*To all whom it may concern:*

Be it known that ROSCOE STEELE, a citizen of the United States, and a resident of Rockaway, county of Morris, and State of New Jersey, has invented an Improvement in Boxes and Methods of Making the Same, of which the following is a specification.

This invention relates to boxes, crates, packages, shipping containers, and the like, and to methods of making the same.

Among other objects, the invention is intended to provide a light, strong package which may be quickly and easily assembled; to provide an open-top box which may be used in the field for packing fruit, vegetables, and the like, and to provide such a box with a removable closing section which may be easily and quickly inserted and removed, whereby the contents may be readily inspected or removed and replaced without disrupting the package.

The invention will be best understood by reference to one illustrative embodiment thereof, shown in the accompanying drawings, in which:

Fig. 1 is a perspective view of a crate form of package embodying the invention.

Fig. 2 is a top plan view of a blank which, when folded into package form, constitutes the four sides of the package shown in Fig. 1.

Fig. 3 is a perspective of the bottom section of the package shown in Fig. 1.

Fig. 4 is a perspective of the removable top section of the package shown in Fig. 1.

Fig. 5 is a perspective of the wedge for locking the top section in position.

Fig. 6 is a perspective of the package shown in Fig. 1 without the top section.

Fig. 7 is a top plan view of the package shown in Fig. 1.

Fig. 8 is a longitudinal section taken on line A—A of Fig. 7.

Fig. 9 is a longitudinal section taken on line B—B of Fig. 7.

Figure 10:
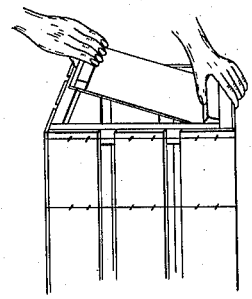

Figs. 10, 11, 12, and 13 are perspective views showing the manner of closing the package.

Figs. 14 and 15 are perspective views showing one manner of opening the package.

Fig. 16 is a perspective view of a box form of package embodying the invention.

The invention is particularly well adapted for embodiment in cleat-reinforced wirebound packages; therefore, a crate package of the wirebound type has been selected for illustration but it will be understood that the invention is not limited to a crate of this type or to a crate but may be embodied in boxes, crates, packages, or shipping containers of various forms and constructions.

Referring to Figs. 1 to 4 inclusive, the illustrative package comprises four side sections of side material 1 and cleats foldably connected by binding wires 3 preferably stapled thereto by staples 4, a bottom section 5, and a top section 6. Sections 5 and 6 are herein referred to as the bottom and top sections, respectively, for convenience of description, it being understood that said sections might be correctly referred to as ends of the package, and, for clearness of description, and bottom cleats have been designatd 2 and the top cleats $s$, $s'$, $x'$, and $n'$, respectively. As shown in Fig. 2, the cleats, which are preferably of the mortise and tenon construction, are secured to the side material of each section, at the ends thereof, by the staples 4 which straddle the binding wires 3, pass through the side material 1 and into or through the cleats. The cleats and side material of each section of the blank are preferably so positioned relative to each other and adjacent sections that the blank will fold into rectangular form and, when folded, the side material will overlap at the corners and the binding wires will be tensioned about the package. The intermediate binding wires may be secured to the side material alone by staples which preferably pass through the side material and clinch on the under side thereof.

To hold the blank in package form after it has been folded, the ends of the binding wires $w$ may be twisted or otherwise secured together, preferably under tension.

Referring to Fig. 1, it will be noted that the cleats outline the top and bottom of the package, forming cleat frames, and that the bottom section 5 rests upon the inner faces of the bottom cleats 2 and is preferably secured thereto by nails, staples, or other fastening means, preferably driven through said bottom section, into the cleats. In practice, the bottom section 5 is usually inserted and secured to the bottom cleats before the ends $w$ of the wire bindings are joined; that is, the blank shown in Fig. 2 is partially folded into a three-sided box, leaving an opening on the fourth side to permit inserting and securing in place the bottom section 5, after which the fourth side is folded into position and the wire ends $w$ joined together. It will be noted that after the bottom section 5 has been inserted and the wire ends $w$ have been joined, the resulting structure constitutes a strong open-top package supported against inward distortion by the cleat frames and securely held against outward expansion by the binding wires. Such a package, by reason of its lightness and strength, is particularly advantageous for use in the field for packing fruit, vegetables, and the like, the cleats of the upper cleat frame being adapted for use as a handle for moving the package from place to place.

For closing the package, a removable section and locking means therefor is provided. Said section, which is designated 6 and shown in Fig. 4, is adapted to be inserted through the opening formed by the cleat frame at the top of the package and positioned within such cleat frame in such a manner as to prevent outward displacement thereof.

Figure 11:
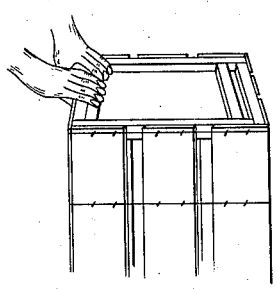

Said removable section 6 comprises a sheet or sheets 7 of side material and two battens 8 and 9 secured crosswise the sheet 7 and so positioned relative to the ends thereof as to leave projections $x$ and $n$ extending beyond the battens 8 and 9, respectively. As shown in Figs. 8 and 9, the sheet 7 is slightly narrower than the distance between the cleats $s$, $s'$ of the opposite side sections, between which section 6 is to be inserted, and is slightly longer than the distance between the cleats $x'$, $n'$ of the other opposite side sections, and the projections $x$ and $n$ extend beyond the battens 8 and 9, respectively, distances corresponding, respectively, to approximately half the width of a cleat and approximately the width of a cleat so that said section 6 may be readily inserted by sliding the portion $n$ under the cleat $n'$ in the manner shown in Fig. 10, lowering the other end between cleats $s$, $s'$ and shifting the section until the portion $x$ rests under the cleat $x'$ and the batten 8 arrests further shifting movement by contact with cleat $x'$. The section will then be held against outward displacement, as shown in Fig. 11, with the portion $x$ under cleat $x'$ and the portion $n$ under cleat $n'$, and with the batten 8 contacting with the cleat $x'$ of the side section.

Figure 12:
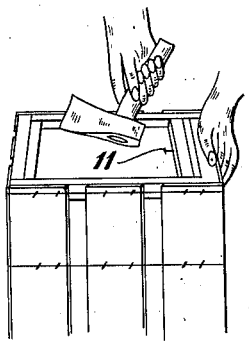
Figure 13:
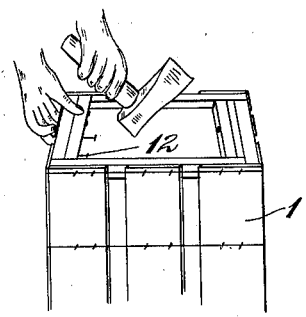

Locking means are provided to prevent shifting of section 6 and to hold it in position under the cleats $x'$ and $n'$. Such locking means may consist of the wedge 10 so constructed and arranged as to be inserted between the batten 9 and the cleat $n'$, as shown in Fig. 12, thereby locking the section against shifting and maintaining the portions $x$ and $n$ beneath cleats $x'$ and $n'$, respectively. The wedge 10 may be held in position in any suitable manner, preferably by driving a nail or fastener 11 through the batten 9 and into the wedge 10; thus, section 6 will be held against lateral and longitudinal displacement by cooperation of the cleats of the side sections with the battens 8 and 9 and the wedge 10, and against outward displacement by cooperation of the portions $x$ and $n$ with the cleats $x'$ and $n'$, respectively.

Ordinarily, the contents of the package will sustain section 6 against inward displacement, but in some instances it has been found desirable to drive one or more nails or fasteners 12 through batten 8 and into the cleat $x'$, thus further sustaining the section against inward displacement.

To open the package, the fastener 11 may be withdrawn, releasing the wedge which, when removed, permits the top section to be shifted toward cleat $n'$, thus releasing portion $x$ from its engagement with cleat $x'$ and permitting the section to be raised between cleats $s$, $s'$ and removed; or the package may be opened by pressing the batten 9 and wedge 10 below cleat $n'$ and shifting the section toward cleat $n'$ to release portion $x$ from cleat $x'$. In instances in which batten 8 has been fastened to cleat $x'$, a hand hatchet has been found to be useful to pry batten 8 from cleat $x'$ to permit the section to be shifted and removed.

Thus it will be noted that a readily removable top section is provided which is adapted to be inserted from without the package, positioned within the cleat frame in a manner to prevent outward displacement, and locked in such position by detachable locking means; and that the top section, so readily inserted, may be as readily removed and reinserted without disrupting or distorting the package to any considerable extent.

It will also be noted that such removable section may be inserted within the wire bindings and removed therefrom without loosening, disengaging or affecting their attachment to the package. This is particularly advantageous in that the wire bindings may be securely and tensionally joined about the package before the insertion of the top section, thus providing an exceptionally strong open-top package of the wirebound type having bindings encircling the package not only at the top and bottom thereof but also about the body intermediate the top and bottom.

Obviously the invention is not limited to the particular illustrative embodiment shown herein but may be used to advantage in various combinations and subcombinations.

What is claimed is:

1. In a wirebound box having a cleat frame outlining the top thereof and so arranged that the top surface of no cleat of said frame is below the bottom surface of any other cleat of said frame, a removable section adapted to be inserted within said cleat frame from without the box and, when shifted, to rest at a plurality of its extremities against the inner face of said cleat frame, and detachable means to hold said removable section in shifted position.

2. In a wirebound box having a cleat frame outlining the top thereof and so arranged that the top surface of no cleat of said frame is below the bottom surface of any other cleat of said frame, a removable section adapted to be inserted within the cleat frame from without the box and, by shifting, to engage at a plurality of its extremities against the inner face of said cleat frame in such a manner as to prevent outward displacement of said removable section, and means to lock said section in said shifted position.

3. In a wirebound box having a cleat frame outlining the top thereof and so arranged that the top surface of no cleat of said frame is below the bottom surface of any other cleat of said frame, a removable section adapted to be inserted within said cleat frame from without the box and, when shifted, to be held thereby at a plurality of its extremities against outward displacement, a batten secured to said section near either end thereof, and a locking member cooperating with said battens and said cleat frame to hold said section in shifted position.

4. The combination of a wirebound open top box having a cleat frame outlining the top thereof and so arranged that the top surface of no cleat of said frame is below the bottom surface of any other cleat of said frame, a separate top therefor adapted to be inserted within said cleat frame and encased thereby in such manner as to be held at a plurality of its extremities against outward displacement when in one position and to permit outward displacemeent when in another position, a batten secured to said top near either end thereof, and a locking member cooperating with a batten and a cleat to hold said top in said first mentioned position.

5. The combination of a wirebound open top box having a cleat frame outlining the top thereof and so arranged that the top surface of no cleat of said frame is below the bottom surface of any other cleat of said frame, a separate top therefor adapted to be inserted within said cleat frame and encased thereby in such a manner as to be held at a plurality of its extremities against outward displacement when in one position and to permit outward displacement when in another position, a batten secured to said top near one end thereof, and a locking member cooperating with said batten and a cleat to hold the top in said first mentioned position.

6. In a wirebound box having a cleat frame outlining the top thereof and so arranged that the top surface of no cleat of said frame is below the bottom surface of any other cleat of said frame, the combination of a removable cover comprising side material and battens secured to the outer face thereof so constructed and arranged as to permit the insertion of said cover within the cleat frame and, when shifted, to be held thereby at a plurality of its extremities against outward displacement, and a detachable locking member for insertion between a batten and a cleat to hold said cover in said shifted position.

7. A wirebound box comprising four separate sections of side material and cleats connected together in foldable relationship by continuous wire binding, said four sections corresponding to the four sides of the box and having their cleats so arranged as to form a cleat frame outlining the top of the box in which frame the top surface of no cleat is below the bottom surface of any other cleat, a removable top section adapted to be inserted within the cleat frame from without the box and to be held at a plurality of its extremities against outward displacement, a batten secured near one end of said top section and cooperating with a cleat to prevent said section from shifting in one direction, a batten secured near the other end of said top section, and a locking member cooperating with said last mentioned batten and a cleat to prevent said section from shifting in the other direction.

8. A wirebound box comprising a bottom section, four side sections comprising side material and cleats with the cleats forming a frame at the top of the box in which frame the top surface of no cleat is below the bottom surface of any other cleat, binding wire encircling the box in the plane of said frame, a removable top section adapted to be inserted within said cleat frame without loosening or disrupting the binding wire, and, by shifting, to assume a position at a plurality of its extremities against the inner face of said frame in such a manner as to prevent outward displacement of said top section, battens secured to said section, and means cooperating with said battens and said frame to hold said top section in said shifted position.

9. The combination of a wirebound box having a cleat frame outlining the top thereof and so arranged that the top surface of no cleat of said frame is below the bottom surface of any other cleat of said frame, a removable section adapted to be inserted within said frame from without the box and, when shifted, to be held at a plurality of its extremities against outward displacement by said frame, a batten secured to said section and a member cooperating with said batten and said frame to hold said section in shifted position.

10. The combination of a wirebound box having a cleat frame outlining the top thereof and so arranged that the top surface of no cleat of said frame is below the bottom surface of any other cleat of said frame, and a removable section adapted to be inserted within said frame from without the box, and, by shifting, to assume such a position within the frame that the section is held against outward displacement by engagement of said frame with a plurality of extremities of the removable section, battens secured to said section, and a locking member for insertion between a batten and a cleat of said frame to hold said section in shifted position.

11. The combination of a box having a wirebound cleat frame outlining the top thereof in which frame the top surface of no cleat is below the bottom surface of any other cleat, and a removable section adapted to be inserted within and removed from said frame without loosening or disrupting the wire binding, said frame acting to hold said section against outward displacement by engagement with a plurality of its extremities when said section is in one position and permitting its withdrawal when in another position, and members carried by said section and cooperating with said frame to control the position of said section.

12. A wirebound box comprising the side material 1, the cleats $s$, $s'$, $x'$ and $n'$ all in the same plane and forming a cleat frame, the removable section 6 having the battens 8 and 9 and the extensions $n$ and $x$ for engagement with the under sides of cleats $n'$ and $x'$ respectively, and the locking member 10, all substantially as described.

13. A method of making wirebound boxes which consists in assembling four separate sections of side material and cleats in co-operative foldable relationship with the cleats at the ends of said sections of side material, in connecting the sections with binding wire, in folding said sections about a bottom section and securing the wire ends together to provide an open top box with a cleat-frame outlining the top thereof in which frame the top surface of no cleat is below the bottom surface of any other cleat, in providing a removable top section therefor having battens secured thereto in a spaced relation to the ends thereof, in inserting said top section within said cleat-frame from without the box, in shifting said top section within said cleat-frame until a plurality of its extremities are held by the frame against outward displacement, and in detachably inserting a locking member between a batten and a cleat to hold said top section in such shifted position, whereby said top section may be inserted and withdrawn without disrupting the other box elements.

14. A method of closing a wirebound cleat-reinforced box having a cleat-frame outlining the top thereof in which frame the top surface of no cleat is below the bottom surface of any other cleat which is characterized by providing a removable top section having battens secured thereto in spaced relation to the ends thereof, inserting said removable top section within said cleat-frame from without the box and shifting it until a plurality of its extremities are held by the frame against outward displacement, and in providing a removable locking member to cooperate with a batten and said cleat-frame to hold said top section in such shifted position, whereby the box may be opened and closed a plurality of times without materially disrupting its elements.

15. A method of closing a wirebound cleat-reinforced box having a wirebound cleat-frame outlining the top thereof and so arranged that the top surface of no cleat of said frame is below the bottom surface of any other cleat of said frame which is characterized by providing a removable top section having battens secured thereto in spaced relation to the ends thereof, inserting one end of said removable section under one cleat of said frame, lowering the other end of said removable section below the plane of said frame and shifting said removable section until its opposite ends lie beneath cleats of the cleat-frame, and locking said removable section in said shifted position by a member adapted to cooperate with a batten and a cleat of said frame.

16. In a box, the combination with the side wall panels and cleats therefor disposed with their outer sides substantially flush with the edges of the panels, of a removable end closure, cleats secured on the outer side of said closure in a spaced relation to its ends so that one end of said closure may be engaged under one wall cleat and the closure shifted longitudinally to engage its other end under the opposite wall cleat with said closure cleats lying in the plane of the wall cleats engaged by said closure, and with the ends of said closure cleats flush with the sides of the closure whereby the closure is supported against substantial sidewise shifting and a locking block adapted to be disposed between one of the closure cleats and the adjacent wall cleat when the other closure cleat is in engagement with the opposite wall cleat and secured to one of the adjacent cleats thereby preventing longitudinal disengaging movement of the closure.

In testimony whereof, I have signed my name to this specification.

ROSCOE STEELE.